US012592201B2

(12) United States Patent
Park et al.

(10) Patent No.: US 12,592,201 B2
(45) Date of Patent: Mar. 31, 2026

(54) GATE DRIVER AND ELECTRONIC APPARATUS INCLUDING THE SAME

(71) Applicant: SAMSUNG DISPLAY CO., LTD., Yongin-si (KR)

(72) Inventors: Junhyun Park, Yongin-si (KR); Youngwan Seo, Yongin-si (KR); Soil Yoon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/014,593

(22) Filed: Jan. 9, 2025

(65) Prior Publication Data

US 2025/0273161 A1 Aug. 28, 2025

(30) Foreign Application Priority Data

Feb. 27, 2024 (KR) ........................ 10-2024-0027846

(51) Int. Cl.
*G09G 3/3266* (2016.01)

(52) U.S. Cl.
CPC ... *G09G 3/3266* (2013.01); *G09G 2310/0286* (2013.01); *G09G 2310/06* (2013.01)

(58) Field of Classification Search
CPC ......... G09G 3/3266; G09G 2310/0286; G09G 2310/06
See application file for complete search history.

(56) References Cited

U.S. PATENT DOCUMENTS

| | | | | |
|---|---|---|---|---|
| 10,283,211 B2 * | 5/2019 | Ma | ......................... | G11C 19/28 |
| 12,154,495 B2 * | 11/2024 | Ma | ......................... | G09G 3/3266 |
| 2017/0278450 A1 * | 9/2017 | Ma | ......................... | G09G 3/3677 |
| 2021/0074215 A1 * | 3/2021 | Park | ......................... | G09G 3/3266 |

FOREIGN PATENT DOCUMENTS

KR 10-2019-0020549 A 3/2019

* cited by examiner

*Primary Examiner* — David Tung
(74) *Attorney, Agent, or Firm* — F. CHAU & ASSOCIATES, LLC

(57) ABSTRACT

A gate driver includes a plurality of stages. Each of the plurality of stages includes a first transistor which transmits an input signal to a control node, a second transistor including a gate connected to an inverting control node, a first terminal which receives a high gate voltage, and a second terminal connected to an output node from which a gate signal is output, a third transistor including a gate connected to the control node, a first terminal which receives a low gate voltage or a clock signal, and a second terminal connected to the output node, and a fourth transistor, which is an NMOS transistor, connected between a terminal of the first transistor and the gate of the sixth transistor, including a gate which receives a global signal having the high gate voltage in an address scan period and the low gate voltage in a self-scan period.

8 Claims, 15 Drawing Sheets

GATE DRIVER AND ELECTRONIC APPARATUS INCLUDING THE SAME

CROSS-REFERENCE TO RELATED APPLICATIONS

This application claims priority under 35 U.S.C. § 119 to Korean Patent Application No. 10-2024-0027846, filed on Feb. 27, 2024, the disclosure of which is incorporated by reference herein in its entirety.

TECHNICAL FIELD

Embodiments relate to a display device. More particularly, embodiments relate to a gate driver with an improved reliability, a display device including the gate driver, and an electronic apparatus including the display device.

DISCUSSION OF RELATED ART

A display device may include a display panel and a gate driver. The display panel may include a plurality of pixels, and the gate driver may include a plurality of stages that provide gate signals to the pixels.

Each of the stages may include a pull-up buffer transistor that outputs a high gate voltage as a gate signal, and a pull-down buffer transistor that outputs a low gate voltage as the gate signal. The pull-down buffer transistor may be turned on in response to a voltage of a control node.

When the display device is driven at a low frequency, a turn-on voltage may be provided to the control node for a relatively long time, and the pull-down buffer transistor may be turned on for a long time. When a leakage current occurs from the control node, the voltage of the control node may rise, and thus, the gate signal may rise.

SUMMARY

Embodiments of the present disclosure provide a gate driver having increased reliability and an electronic apparatus including the gate driver.

According to an embodiment of the present disclosure, in a gate driver including a plurality of stages, each of the plurality of stages includes a first transistor which transmits an input signal to a control node, a second transistor including a gate connected to an inverting control node, a first terminal which receives a high gate voltage, and a second terminal connected to an output node from which a gate signal is output, a third transistor including a gate connected to the control node, a first terminal which receives a low gate voltage or a clock signal, and a second terminal connected to the output node, and a seventh transistor, which is an n-channel metal oxide semiconductor (NMOS) transistor, connected between a second terminal of the first transistor and the gate of the sixth transistor, and including a gate which receives a global signal having the high gate voltage in an address scan period and the low gate voltage in a self-scan period.

In an embodiment, each of the plurality of stages further includes a fifth transistor including a gate connected to the control node, a first terminal which receives the low gate voltage, and a second terminal connected to the inverting control node, and a sixth transistor including a gate connected to the control node, a first terminal which receives the high gate voltage, and a second terminal connected to the inverting control node.

In an embodiment, each of the plurality of stages further includes a fifth transistor which divides the control node into a first control node and a second control node, the fifth transistor including a gate which receives the low gate voltage, a first terminal connected to the first control node, and a second terminal connected to the second control node.

In an embodiment, the fifth transistor further includes a back gate which receives the high gate voltage.

In an embodiment, each of the plurality of stages further includes a first capacitor including a first terminal connected to the control node and a second terminal connected to the output node, and a second capacitor including a first terminal which receives the high gate voltage and a second terminal connected to the inverting control node.

In an embodiment, each of the plurality of stages further includes a capacitor including a first terminal connected to the control node and a second terminal which receives the low gate voltage.

In an embodiment, each of the plurality of stages further includes a fifth transistor including a gate connected to the inverting control node, a first terminal which receives the low gate voltage, and a second terminal connected to the output node.

According to an embodiment of the present disclosure, in a gate driver including a plurality of stages, each of the plurality of stages includes a first transistor, which is an NMOS transistor, which transmits an input signal to a control node, and includes a gate which receives a global signal having a clock signal in an address scan period and a low gate voltage in a self-scan period, a second transistor including a gate connected to an inverting control node, a first terminal which receives a high gate voltage, and a second terminal connected to an output node from which a gate signal is output, and a third transistor including a gate connected to the control node, a first terminal which receives the low gate voltage or the clock signal, and a second terminal connected to the output node.

In an embodiment, each of the plurality of stages further includes a fourth transistor including a gate connected to the control node, a first terminal which receives the low gate voltage, and a second terminal connected to the inverting control node, and a fifth transistor including a gate connected to the control node, a first terminal which receives the high gate voltage, and a second terminal connected to the inverting control node.

In an embodiment, each of the plurality of stages further includes a fourth transistor which divides the control node into a first control node and a second control node, the fourth transistor including a gate which receives the low gate voltage, a first terminal connected to the first control node, and a second terminal connected to the second control node.

In an embodiment, the fourth transistor further includes a back gate which receives the high gate voltage.

In an embodiment, each of the plurality of stages further includes a first capacitor including a first terminal connected to the control node and a second terminal connected to the output node, and a second capacitor including a first terminal which receives the high gate voltage and a second terminal connected to the inverting control node.

In an embodiment, each of the plurality of stages further includes a capacitor including a first terminal connected to the control node and a second terminal which receives the low gate voltage.

In an embodiment, each of the plurality of stages further includes a fourth transistor including a gate connected to the inverting control node, a first terminal which receives the low gate voltage, and a second terminal connected to the output node.

According to an embodiment of the present disclosure, in a gate driver including first to $n^{th}$ (where n is a positive integer greater than 1) stages, a $k^{th}$ (where k is a positive integer greater than 1 and less than n) stage among the first to $n^{th}$ stages includes a first transistor which transmits an input signal to a control node, a second transistor including a gate connected to an inverting control node, a first terminal which receives a high gate voltage, and a second terminal connected to an output node from which a gate signal is output, a third transistor including a gate connected to the control node, a first terminal which receives a low gate voltage or a clock signal, and a second terminal connected to the output node, and a fourth transistor, which is an NMOS transistor, connected between a terminal of the first transistor and the gate of the third transistor, and including a gate which receives a voltage of the control node of one of a $k-1^{th}$ stage and the $k^{th}$ stage.

In an embodiment, the $k^{th}$ stage further includes a fifth transistor, which is an NMOS transistor, including a gate which receives a voltage of the control node of another one of the $k-1^{th}$ stage and the $k^{th}$ stage, a first terminal connected to a first terminal of the fourth transistor, and a second terminal connected to a second terminal of the fourth transistor.

In an embodiment, the $k^{th}$ stage further includes a fifth transistor including a gate connected to the control node, a first terminal which receives the low gate voltage, and a second terminal connected to the inverting control node, and a sixth transistor including a gate connected to the control node, a first terminal which receives the high gate voltage, and a second terminal connected to the inverting control node.

In an embodiment, the $k^{th}$ stage further includes a fifth transistor which divides the control node into a first control node and a second control node, the fifth transistor including a gate which receives the low gate voltage, a first terminal connected to the first control node, and a second terminal connected to the second control node.

In an embodiment, the fifth transistor further includes a back gate which receives the high gate voltage.

In an embodiment, the $k^{th}$ stage further includes a first capacitor including a first terminal connected to the control node and a second terminal connected to the output node, and a second capacitor including a first terminal which receives the high gate voltage and a second terminal connected to the inverting control node.

According to an embodiment of the present disclosure, an electronic apparatus includes a display panel including a plurality of pixels, a gate driver including a plurality of stages which provide a plurality of gate signals to the plurality of pixels, a controller which provides a gate control signal to the gate driver, and a processor which provides a controller control signal to the controller. Each of the plurality of stages includes a first transistor which transmits an input signal to a control node, a second transistor including a gate connected to an inverting control node, a first terminal which receives a high gate voltage, and a second terminal connected to an output node from which one of the plurality of gate signals is output, a third transistor including a gate connected to the control node, a first terminal which receives a low gate voltage or a clock signal, and a second terminal connected to the output node, and a fourth transistor, which is an n-channel metal oxide semiconductor (NMOS) transistor, connected between a terminal of the first transistor and the gate of the third transistor, and including a gate which receives a global signal having the high gate voltage in an address scan period and the low gate voltage in a self-scan period.

In a gate driver according to embodiments of the present disclosure, an NMOS transistor may be disposed between the input terminal and the control node. As a result, a leakage current may not occur from the gate of the pull-down buffer transistor in the self-scan period. Accordingly, the gate signal may be maintained at the low gate voltage in the self-scan period, and the reliability of the gate driver may be increased.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
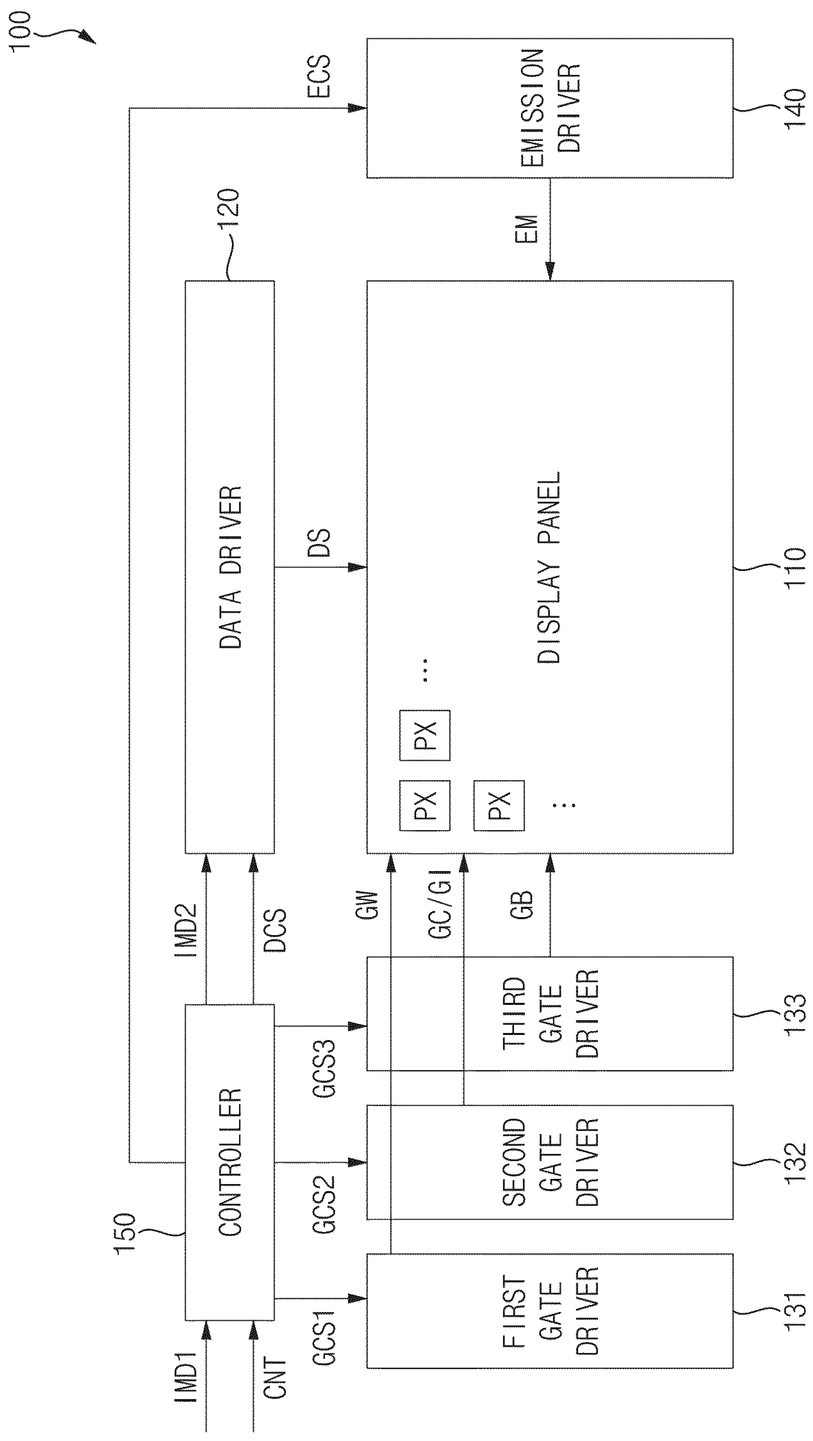
FIG. 1 is a block diagram showing a display device according to an embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

The term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a block diagram showing a display device 100 according to an embodiment.

Referring to FIG. 1, the display device 100 may include a display panel 110, a data driver 120, first to third gate drivers 131, 132, and 133, an emission driver 140, and a controller 150. Each gate driver may also be referred to as a gate driver circuit.

The display panel 110 may include a plurality of pixels PX. Each of the pixels PX may display an image based on a first gate signal GW, a second gate signal GC, a third gate signal GI, a fourth gate signal GB, an emission signal EM, and a data signal DS.

The data driver 120 may provide the data signal DS to the pixels PX. The data driver 120 may generate the data signal DS based on second image data IMD2 and a data control signal DCS. The second image data IMD2 may include a plurality of grayscale values corresponding to the pixels PX. The data control signal DCS may include, for example, an output data enable signal, a horizontal start signal, a load signal, etc.

The first gate driver 131 may provide the first gate signal GW to the pixels PX. The first gate driver 131 may generate the first gate signal GW based on a first gate control signal GCS1. The first gate control signal GCS1 may include, for example, a first gate clock signal, a first gate start signal, etc.

The second gate driver 132 may provide the second gate signal GC and the third gate signal GI to the pixels PX. The second gate driver 132 may generate the second gate signal GC and the third gate signal GI based on a second gate control signal GCS2. The second gate control signal GCS2 may include, for example, a second gate clock signal, a second gate start signal, etc.

The third gate driver 133 may provide the fourth gate signal GB to the pixels PX. The third gate driver 133 may generate the fourth gate signal GB based on a third gate control signal GCS3. The third gate control signal GCS3 may include, for example, a third gate clock signal, a third gate start signal, etc.

The emission driver 140 may provide the emission signal EM to the pixels PX. The emission driver 140 may generate the emission signal EM based on an emission control signal ECS. The emission control signal ECS may include, for example, an emission clock signal, an emission start signal, etc.

The controller 150 may control an operation (or driving) of the data driver 120, operations (or driving) of the first to third gate drivers 131, 132, and 133, and an operation (or driving) of the emission driver 140. The controller 150 may output the second image data IMD2 and the data control signal DCS to the data driver 120, may output the first to third gate control signals GCS1, GCS2, and GCS3 to the first to third gate drivers 131, 132, and 133, and may output the emission control signal ECS to the emission driver 140. The controller 150 may generate the second image data IMD2, the data control signal DCS, the first to third gate control signals GCS1, GCS2, and GCS3, and the emission control signal ECS based on first image data IMD1 and a controller control signal CNT. The first image data IMD1 may include a plurality of grayscale values corresponding to the pixels PX. The controller control signal CNT may include, for example, a master clock signal, a vertical start signal, a horizontal start signal, an input data enable signal, etc.

Figure 2:
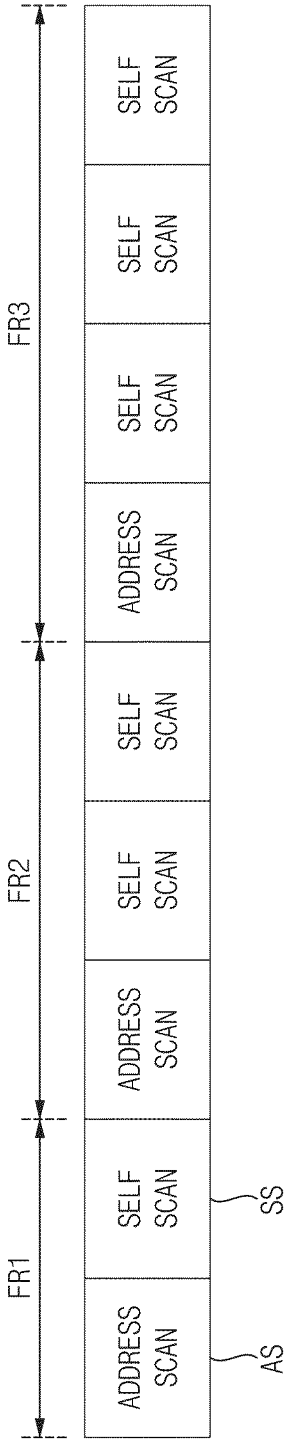
FIG. 2 is a view for describing a driving method of the display device of FIG. 1.

FIG. 2 is a view for describing a driving method of the display device 100 of FIG. 1.

Referring to FIGS. 1 and 2, a frame period of the display device 100 may include an address scan period AS and at least one self-scan period SS. The address scan period AS may be defined as a period in which the data signal DS is applied to the display panel 110. In the address scan period AS, the display device 100 may display an image based on the data signal DS applied in the address scan period AS. The self-scan period SS may be defined as a period in which the data signal DS is not applied to the display panel 110. In the self-scan period SS, the display device 100 may display an image based on the data signal DS applied in the address scan period AS.

The display device 100 may change a driving frequency (or refresh rate) of the display device 100 by adjusting the number of self-scan periods SS included in the frame period. As the number of self-scan periods SS included in the frame period decreases, the driving frequency of the display device 100 may increase. As the number of self-scan periods SS included in the frame period increases, the driving frequency of the display device 100 may decrease.

In an embodiment, as shown in FIG. 2, when a first frame period FR1 includes one self-scan period SS, a second frame period FR2 includes two self-scan periods SS, and a third frame period FR3 includes three self-scan periods SS, a driving frequency of the second frame period FR2 may be less than a driving frequency of the first frame period FR1, and a driving frequency of the third frame period FR3 may be less than the driving frequency of the second frame period FR2. For example, the driving frequency of the first frame period FR1 may be about 120 Hz, the driving frequency of the second frame period FR2 may be about 80 Hz, and the driving frequency of the third frame period FR3 may be about 60 Hz.

Figure 3:
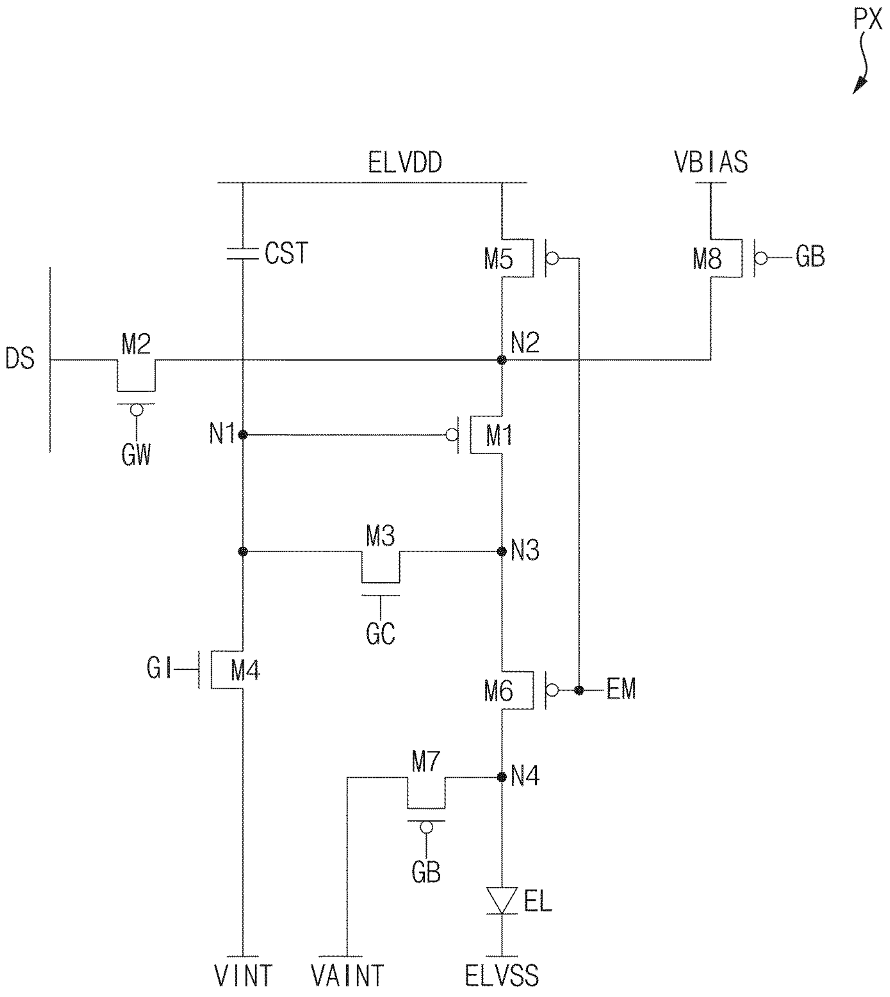
FIG. 3 is a circuit diagram showing an example of a pixel included in the display device of FIG. 1.

FIG. 3 is a circuit diagram showing an example of a pixel PX included in the display device 100 of FIG. 1.

Referring to FIGS. 1 and 3, the pixel PX may receive the data signal DS, the first gate signal GW, the second gate signal GC, the third gate signal GI, the fourth gate signal GB, the emission signal EM, a first initialization voltage VINT, a second initialization voltage VAINT, a first power voltage ELVDD, and a second power voltage ELVSS.

The pixel PX may include a driving transistor M1, a write transistor M2, a compensation transistor M3, an initialization transistor M4, a first emission transistor M5, a second emission transistor M6, a bypass transistor M7, a bias transistor M8, a storage capacitor CST, and a light emitting element EL.

The driving transistor M1 may include a gate connected to a first node N1, a first terminal connected to a second node N2, and a second terminal connected to a third node N3. The driving transistor M1 may generate a driving current corresponding to a voltage difference between the first node N1 and the second node N2.

The write transistor M2 may include a gate that receives the first gate signal GW, a first terminal that receives the data signal DS, and a second terminal connected to the second node N2. The write transistor M2 may transmit the data signal DS to the second node N2 in response to the first gate signal GW.

The compensation transistor M3 may include a gate that receives the second gate signal GC, a first terminal connected to the third node N3, and a second terminal connected to the first node N1. The compensation transistor M3 may connect the first node N1 and the third node N3 in response to the second gate signal GC.

The initialization transistor M4 may include a gate that receives the third gate signal GI, a first terminal that receives the first initialization voltage VINT, and a second terminal connected to the first node N1. The initialization transistor M4 may transmit the first initialization voltage VINT to the first node N1 in response to the third gate signal GI.

The first emission transistor M5 may include a gate that receives the emission signal EM, a first terminal that receives the first power voltage ELVDD, and a second terminal connected to the second node N2. The first emission transistor M5 may transmit the first power voltage ELVDD to the second node N2 in response to the emission signal EM.

The second emission transistor M6 may include a gate that receives the emission signal EM, a first terminal connected to the third node N3, and a second terminal connected to a fourth node N4. The second emission transistor M6 may connect the third node N3 and the fourth node N4 in response to the emission signal EM.

The bypass transistor M7 may include a gate that receives the fourth gate signal GB, a first terminal that receives the second initialization voltage VAINT, and a second terminal connected to the fourth node N4. The bypass transistor M7 may transmit the second initialization voltage VAINT to the fourth node N4 in response to the fourth gate signal GB.

The bias transistor M8 may include a gate that receives the fourth gate signal GB, a first terminal that receives a bias voltage VBIAS, and a second terminal connected to the second node N2. The bias transistor M8 may transmit the bias voltage VBIAS to the second node N2 in response to the fourth gate signal GB.

In an embodiment, each of the driving transistor M1, the write transistor M2, the first emission transistor M5, the second emission transistor M6, the bypass transistor M7, and the bias transistor M8 may be a p-channel metal oxide semiconductor (PMOS) transistor, and each of the compensation transistor M3 and the initialization transistor M4 may be an n-channel metal oxide semiconductor (NMOS) transistor.

The storage capacitor CST may include a first terminal that receives the first power voltage ELVDD and a second terminal connected to the first node N1. The storage capacitor CST may store a voltage of the first node N1.

The light emitting element EL may include a first terminal (e.g., an anode) connected to the fourth node N4 and a second terminal (e.g., a cathode) that receives the second power voltage ELVSS. The light emitting element EL may emit light corresponding to the driving current generated from the driving transistor M1.

In an embodiment, the light emitting element EL may be an organic light emitting diode. In an embodiment, the light emitting element EL may be any one of an inorganic light emitting diode, a micro light emitting diode, and a quantum dot light emitting diode.

Figure 4:
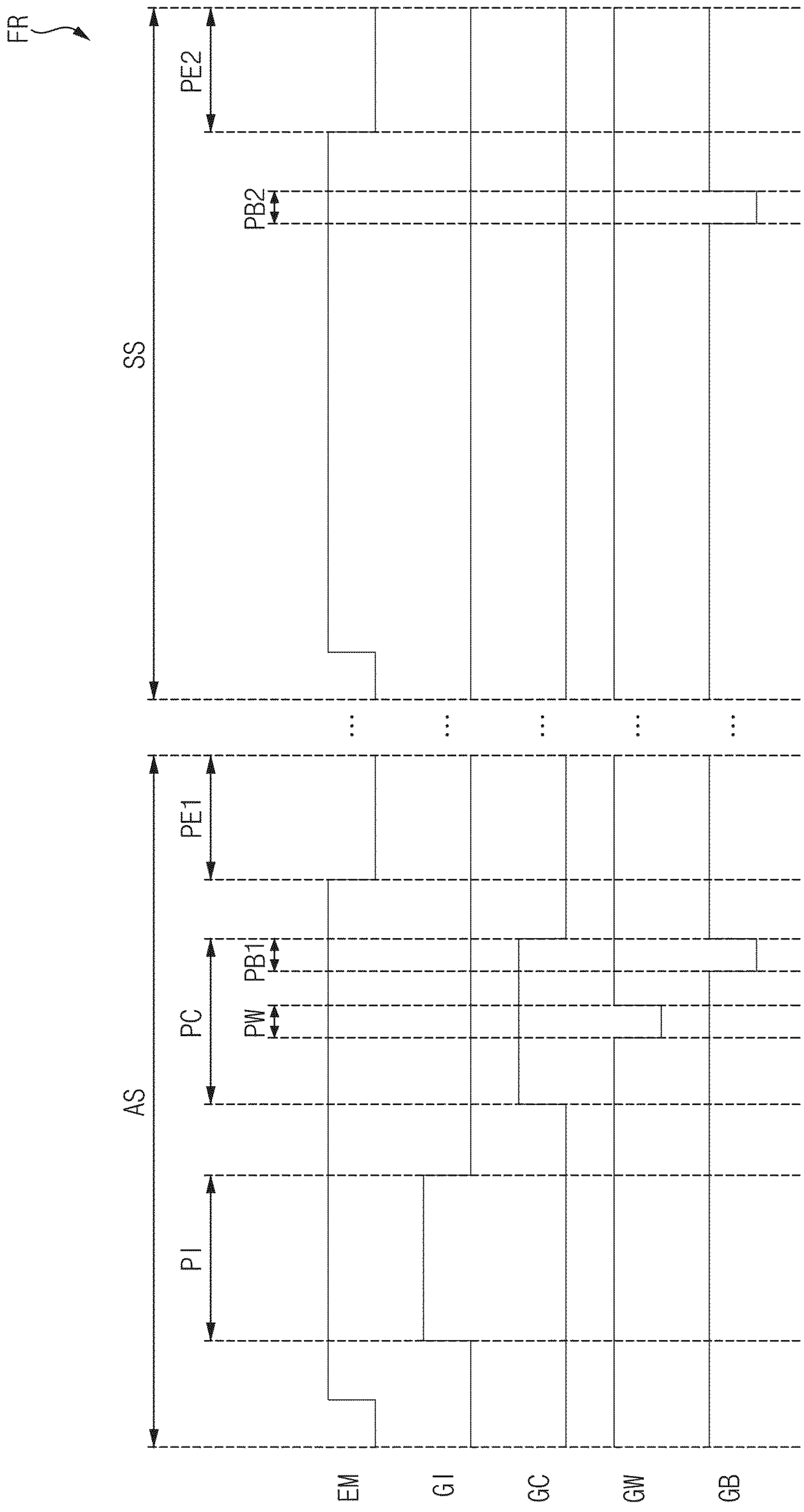
FIG. 4 is a view for describing a driving method of the pixel of FIG. 3.

FIG. 4 is a view for describing a driving method of the pixel PX of FIG. 3.

Referring to FIGS. 3 and 4, the frame period FR may include an address scan period AS and at least one self-scan period SS. The address scan period AS may include an initialization period PI, a compensation period PC, a write period PW, a first bypass period PB1, and a first emission period PE1. The self-scan period SS may include a second bypass period PB2 and a second emission period PE2. The second gate signal GC may be a signal in which the third gate signal GI is shifted by a predetermined amount of time.

In the initialization period PI, the initialization transistor M4 may be turned on in response to the third gate signal GI having a high voltage level, and the first initialization voltage VINT may be transmitted to the first node N1. Accordingly, the gate of the driving transistor M1 may be initialized with the first initialization voltage VINT.

In the compensation period PC, the compensation transistor M3 may be turned on in response to the second gate signal GC having a high voltage level, and the third node N3 and the first node N1 may be connected. Accordingly, the driving transistor M1 may be diode-connected.

In the write period PW, the write transistor M2 may be turned on in response to the first gate signal GW having a low voltage level, and the data signal DS may be transmitted to the second node N2. The data signal DS in which a threshold voltage of the driving transistor M1 is reflected may be applied to the first node N1 by the diode-connected driving transistor M1.

In the first bypass period PB1, the bypass transistor M7 may be turned on in response to the fourth gate signal GB having a low voltage level, and the second initialization voltage VAINT may be transmitted to the fourth node N4. Accordingly, the first terminal of the light emitting element EL may be initialized with the second initialization voltage VAINT. Further, the bias transistor M8 may be turned on in response to the fourth gate signal GB having the low voltage level in the first bypass period PB1, and the bias voltage VBIAS may be transmitted to the second node N2. Accordingly, the driving transistor M1 may be on-biased by the bias voltage VBIAS.

In the first emission period PE1, the first emission transistor M5 and the second emission transistor M6 may be turned on in response to the emission signal EM having a low voltage level, and a current path may be formed between a line transmitting the first power voltage ELVDD and a line transmitting the second power voltage ELVSS. Accordingly, the driving transistor M1 may generate the driving current corresponding to the voltage difference between the first node N1 and the second node N2, and the light emitting element EL may emit light with a luminance corresponding to the driving current.

In the second bypass period PB2, the bypass transistor M7 may be turned on in response to the fourth gate signal GB having the low voltage level, and the second initialization voltage VAINT may be transmitted to the fourth node N4. Accordingly, the first terminal of the light emitting element EL may be initialized with the second initialization voltage VAINT. Further, in the second bypass period PB2, the bias transistor M8 may be turned on in response to the fourth gate signal GB having the low voltage level, and the bias voltage VBIAS may be transmitted to the second node N2. Accordingly, the driving transistor M1 may be on-biased by the bias voltage VBIAS.

In the second emission period PE2, the first emission transistor M5 and the second emission transistor M6 may be turned on in response to the emission signal EM having the low voltage level, and a current path may be formed between the line transmitting the first power voltage ELVDD and the line transmitting the second power voltage ELVSS. Accordingly, the driving transistor M1 may generate the driving current corresponding to the voltage difference between the first node N1 and the second node N2, and the light emitting element EL may emit light with a luminance corresponding to the driving current.

Figure 5:
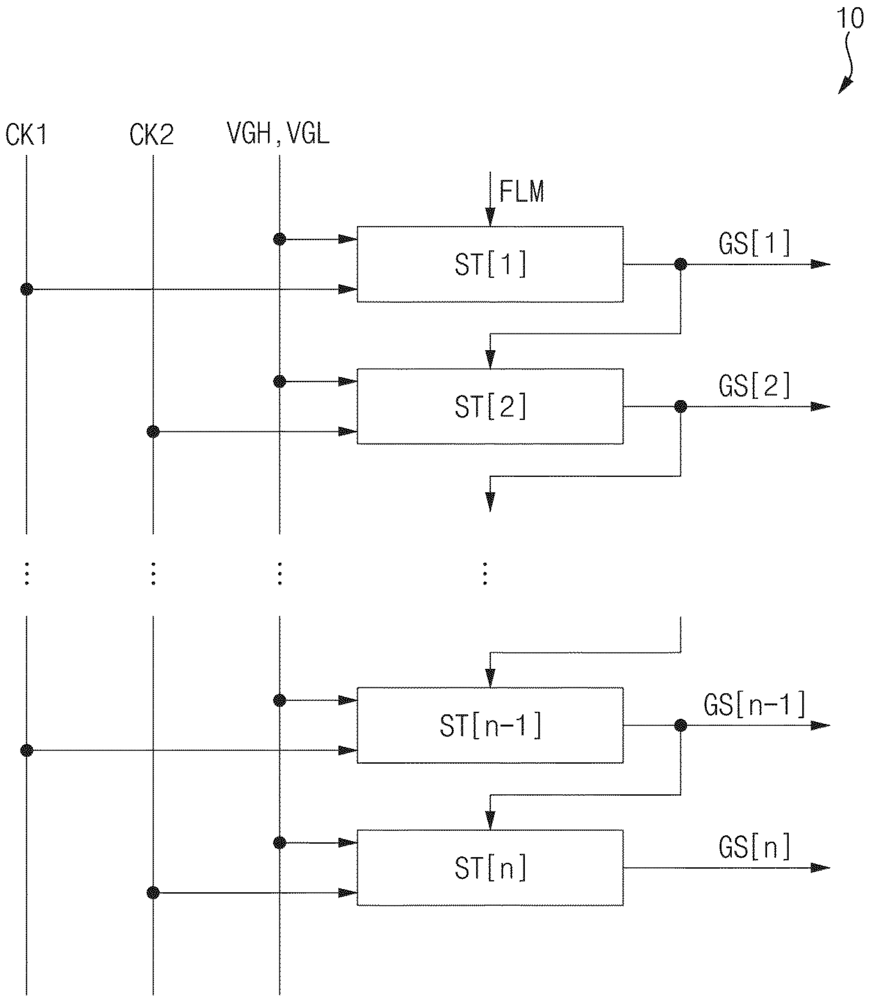
FIG. 5 is a block diagram showing a gate driver according to an embodiment.

FIG. 5 is a block diagram showing a gate driver 10 according to an embodiment.

Referring to FIG. 5, the gate driver 10 may receive a first clock signal CK1, a second clock signal CK2, a high gate voltage VGH, a low gate voltage VGL, and a gate start signal FLM, and may output first to $n^{th}$ (n is a positive integer greater than 1) gate signals GS[1], GS[2], . . . , GS[n−1], and GS[n]. The second clock signal CK2 may be a signal in which the first clock signal CK1 is shifted by half a period (e.g., 1 horizontal time period) of the first clock signal CK1. The high gate voltage VGH may be a turn-off voltage of the PMOS transistor and a turn-on voltage of the NMOS transistor. The low gate voltage VGL may be a turn-on voltage of the PMOS transistor and a turn-off voltage of the NMOS transistor.

In an embodiment, the gate driver 10 may correspond to the second gate driver 132 of FIG. 1. In this case, the first to $n^{th}$ gate signals GS[1], GS[2], . . . , GS[n−1], and GS[n] may correspond to the second gate signal GC or the third gate signal GI.

The gate driver 10 may include first to $n^{th}$ stages ST[1], ST[2], . . . , ST[n−1], and ST[n].

Each of the first to $n^{th}$ stages ST[1], ST[2], . . . , ST[n−1], and ST[n] may receive the high gate voltage VGH and the low gate voltage VGL. Each of the first to $n^{th}$ stages ST[1], ST[2], . . . , ST[n−1], and ST[n] may receive the first clock signal CK1 or the second clock signal CK2. In an embodiment, each of odd-numbered stages ST[1], . . . , ST[n−1] may receive the first clock signal CK1, and each of even-numbered stages ST[2], . . . , ST[n] may receive the second clock signal CK2. The first stage ST[1] may receive the gate start signal FLM, and each of the second to $n^{th}$ stages ST[2], . . . , ST[n−1], and ST[n] may receive a gate signal output from the previous stage. The first to $n^{th}$ stages ST[1], ST[2], . . . , ST[n−1], and ST[n] may output the first to $n^{th}$ gate signals GS[1], GS[2], . . . , GS[n−1], and GS[n], respectively.

Figure 6:
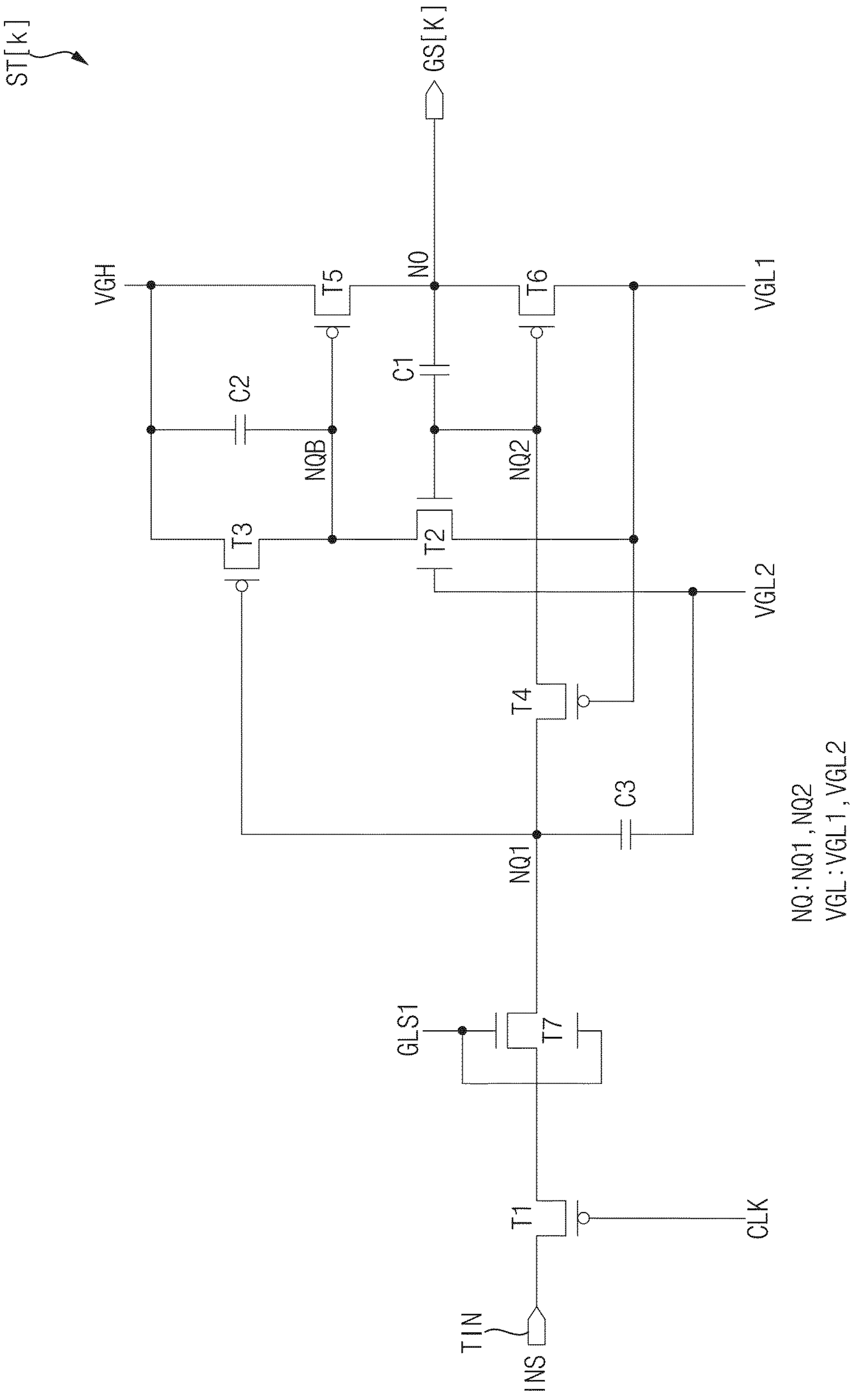
FIG. 6 is a circuit diagram showing an example of a $k^{th}$ stage included in the gate driver of FIG. 5.

FIG. 6 is a circuit diagram showing an example of a $k^{th}$ stage ST[k] included in the gate driver 10 of FIG. 5.

Referring to FIGS. 5 and 6, the $k^{th}$ stage ST[k] (k is a positive integer greater than or equal to 1 and less than or equal to n) may receive an input signal INS, a clock signal CLK, the high gate voltage VGH, the low gate voltage VGL, and a global signal GLS1, and may output a $k^{th}$ gate signal GS[k]. The low gate voltage VGL may include a first low gate voltage VGL1 and a second low gate voltage VGL2. When the $k^{th}$ stage ST[k] is the first stage ST[1], the input signal INS may be the gate start signal FLM. When the $k^{th}$ stage ST[k] is one of the second to $n^{th}$ stages ST[2], . . . , ST[n−1], and ST[n], the input signal INS may be a $k-1^{th}$ gate signal output from a $k-1^{th}$ stage. When the $k^{th}$ stage ST[k] is one of the odd-numbered stages ST[1], . . . , ST[n−1], the clock signal CLK may be the first clock signal CK1. When the $k^{th}$ stage ST[k] is one of the even-numbered stages ST[2], . . . , ST[n], the clock signal CLK may be the second clock signal CK2.

The $k^{th}$ stage ST[k] may include a first transistor T1, a second transistor T2, a third transistor T3, a fourth transistor T4, a fifth transistor T5, a sixth transistor T6, a seventh transistor T7, a first capacitor C1, a second capacitor C2, and a third capacitor C3.

The first transistor T1 may transmit the input signal INS to a control node NQ. In an embodiment, the first transistor T1 may include a gate that receives the clock signal CLK, a first terminal connected to an input terminal TIN, and a second terminal. The input signal INS may be input to the input terminal TIN. The first transistor T1 may transmit the input signal INS in response to the clock signal CLK.

The second transistor T2 may include a gate connected to the control node NQ (e.g., a second control node NQ2), a first terminal that receives the first low gate voltage VGL1, and a second terminal connected to an inverting control node NQB. In an embodiment, the second transistor T2 may further include a back gate that receives the second low gate voltage VGL2. The second transistor T2 may transmit the first low gate voltage VGL1 to the inverting control node NQB in response to a voltage of the control node NQ.

The third transistor T3 may include a gate connected to the control node NQ (e.g., a first control node NQ1), a first terminal that receives the high gate voltage VGH, and a second terminal connected to the inverting control node NQB. The third transistor T3 may transmit the high gate voltage VGH to the inverting control node NQB in response to the voltage of the control node NQ.

The fourth transistor T4 may divide the control node NQ into the first control node NQ1 and the second control node NQ2. The fourth transistor T4 may include a gate that receives the first low gate voltage VGL1, a first terminal connected to the first control node NQ1, and a second terminal connected to the second control node NQ2. As the first low gate voltage VGL1 is applied to the gate of the fourth transistor T4, the fourth transistor T4 may be an always-on transistor (AOT).

The fifth transistor T5 may include a gate connected to the inverting control node NQB, a first terminal that receives the high gate voltage VGH, and a second terminal connected to an output node NO. The gate signal GS[k] may be output from the output node NO. The fifth transistor T5 may transmit the high gate voltage VGH to the output node NO in response to a voltage of the inverting control node NQB. The fifth transistor T5 may be referred to as a pull-up buffer transistor.

The sixth transistor T6 may include a gate connected to the second control node NQ2, a first terminal that receives the first low gate voltage VGL1 or the clock signal CLK, and a second terminal connected to the output node NO. The sixth transistor T6 may transmit the first low gate voltage VGL1 to the output node NO in response to a voltage of the second control node NQ2. The sixth transistor T6 may be referred to as a pull-down buffer transistor.

Although FIG. 6 illustrates an embodiment in which the first terminal of the sixth transistor T6 receives the first low gate voltage VGL1, the present disclosure is not limited thereto. For example, in an embodiment, the first terminal of the sixth transistor T6 may receive the clock signal CLK.

The seventh transistor T7 may be an NMOS transistor. The seventh transistor T7 may be connected between the second terminal of the first transistor T1 and the gate of the sixth transistor T6, and may include a gate that receives the global signal GLS1. In an embodiment, the seventh transistor T7 may further include a back gate that receives the global signal GLS1.

In an embodiment, as shown in FIG. 6, the first terminal of the seventh transistor T7 may be connected to the second terminal of the first transistor T1, and the second terminal of the seventh transistor T7 may be connected to the first control node NQ1. In this case, the seventh transistor T7 may connect the second terminal of the first transistor T1 and the first control node NQ1 in response to the global signal GLS1. In an embodiment, the first terminal of the seventh transistor T7 may be connected to the second terminal of the fourth transistor T4, and the second terminal of the seventh transistor T7 may be connected to the second control node NQ2. In this case, the seventh transistor T7 may connect the second terminal of the fourth transistor T4 and the second control node NQ2 in response to the global signal GLS1.

The first capacitor C1 may include a first terminal connected to the second control node NQ2 and a second terminal connected to the output node NO. The first capacitor C1 may store a voltage difference between the second control node NQ2 and the output node NO.

The second capacitor C2 may include a first terminal that receives the high gate voltage VGH and a second terminal connected to the inverting control node NQB. The second capacitor C2 may store the voltage of the inverting control node NQB.

The third capacitor C3 may include a first terminal connected to the first control node NQ1 and a second terminal that receives the second low gate voltage VGL2. The third capacitor C3 may store the voltage of the first control node NQ1.

In an embodiment, each of the first transistor T1, the third transistor T3, the fourth transistor T4, the fifth transistor T5, and the sixth transistor T6 may be a PMOS transistor, and the second transistor T2 may be an NMOS transistor. However, the present disclosure is not limited thereto. For example, in an embodiment, at least one of the first transistor T1, the third transistor T3, the fourth transistor T4, the fifth transistor T5, and the sixth transistor T6 may be an NMOS transistor, and the second transistor T2 may be a PMOS transistor.

Figure 7:
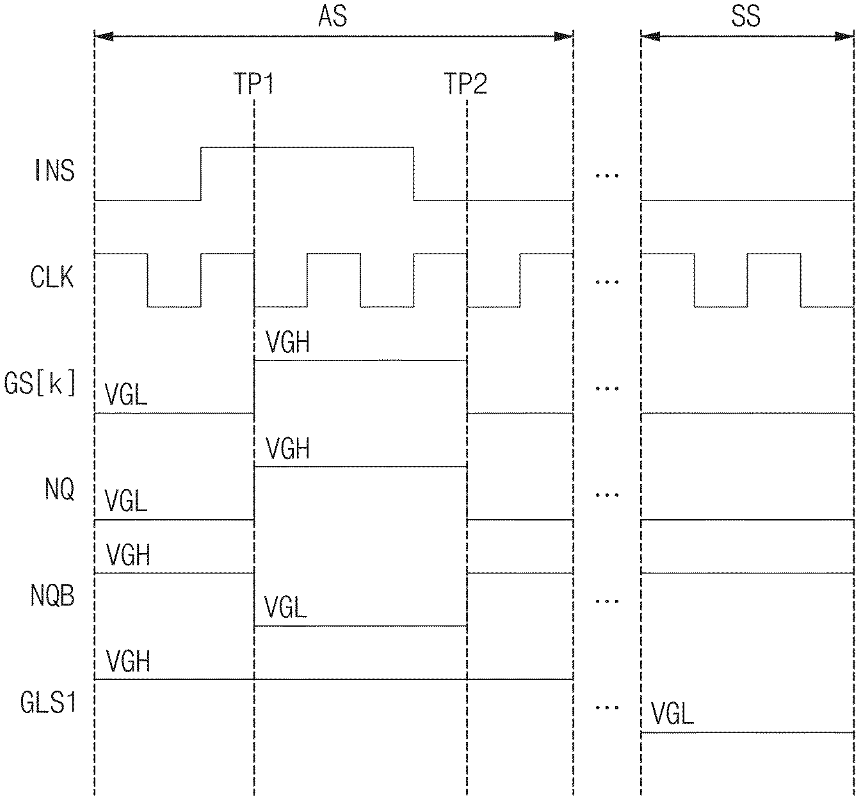
FIG. 7 is a view for describing a driving method of the $k^{th}$ stage of FIG. 6.

FIG. 7 is a view for describing a driving method of the $k^{th}$ stage ST[k] of FIG. 6.

Referring to FIGS. 6 and 7, the global signal GLS1 may have the high gate voltage VGH in the address scan period AS, and may have the low gate voltage VGL in the self-scan period SS.

The seventh transistor T7 may be turned on in response to the global signal GLS1 having the high gate voltage VGH in the address scan period AS, and the second terminal of the first transistor T1 may be connected to the control node NQ. Accordingly, the input signal INS may be transmitted to the control node NQ in the address scan period AS, and the gate signal GS[k] having the high gate voltage VGH may be output in response to the high gate voltage VGH of the control node NQ and the low gate voltage VGL of the inverted control node NQB between a first time point TP1 and a second time point TP2.

In an embodiment, the seventh transistor T7 may be turned off in response to the global signal GLS1 having the low gate voltage VGL in the self-scan period SS, and the second terminal of the first transistor T1 is not connected to the control node NQ. Accordingly, in an embodiment, the input signal INS is not transmitted to the control node NQ in the self-scan period SS, and the gate signal GS[k] having the low gate voltage VGL may be output in response to the low gate voltage VGL of the control node NQ and the high gate voltage VGH of the inverting control node NQB.

The control node NQ may have the low gate voltage VGL for a relatively long time in the self-scan period SS. The magnitude of the leakage current of the NMOS transistor may be less than the magnitude of the leakage current of the PMOS transistor. When the $k^{th}$ stage ST[k] does not include the seventh transistor T7, a leakage current may occur from the gate of the sixth transistor T6 through the first and fourth transistors T1 and T4, which are the PMOS transistors connected to the control node NQ in the self-scan period SS, and accordingly, the voltage of the control node NQ may rise from the low gate voltage VGL, and the gate signal GS[k] may rise from the low gate voltage VGL. In this case, as the voltage of the gate signal GS[k] rises in the self-scan period SS, the reliability of the gate driver 10 may be decreased.

In an embodiment of the present disclosure, because the $k^{th}$ stage ST[k] includes the seventh transistor T7, which is an NMOS transistor disposed between the input terminal TIN and the control node NQ, a leakage current may be prevented from occurring at the gate of the sixth transistor T6 in the self-scan period SS. As a result, the voltage of the control node NQ may be maintained at the low gate voltage VGL, and the gate signal GS[k] may remain stable at the low gate voltage VGL. By ensuring the gate signal GS[k] stays at the low gate voltage VGL in the self-scan period SS, the reliability of the gate driver 10 may be increased.

Figure 8:
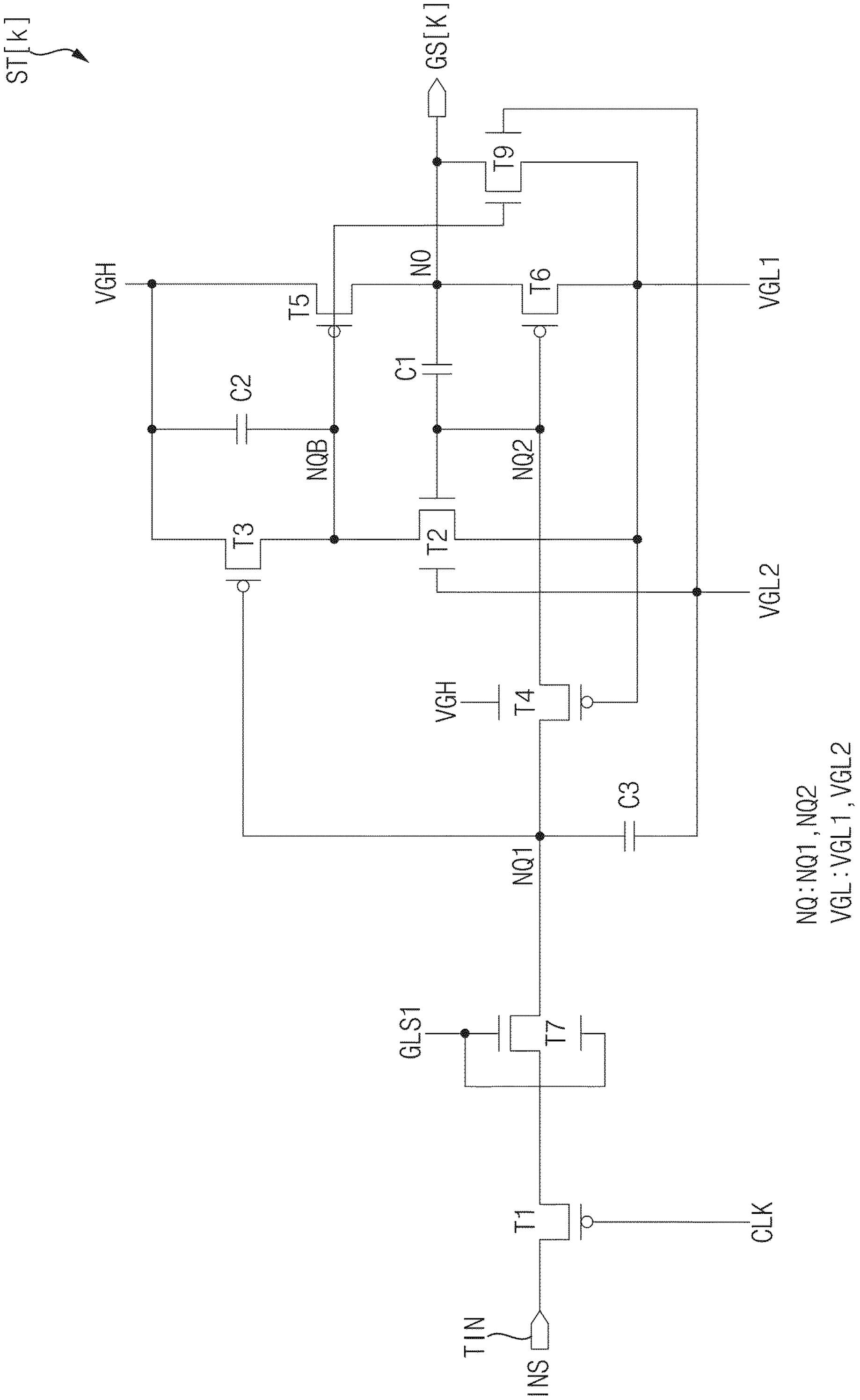
FIG. 8 is a circuit diagram showing an example of a $k^{th}$ stage included in the gate driver of FIG. 5.

FIG. 8 is a circuit diagram showing an example of the $k^{th}$ stage ST[k] included in the gate driver 10 of FIG. 5.

For convenience of explanation, a further description of components of the $k^{th}$ stage ST[k] described with reference to FIG. 8, which are substantially the same as or similar to those of the $k^{th}$ stage ST[k] described with reference to FIG. 6, will be omitted.

Referring to FIG. 8, the $k^{th}$ stage ST[k] may include a first transistor T1, a second transistor T2, a third transistor T3, a fourth transistor T4, a fifth transistor T5, a sixth transistor T6, a seventh transistor T7, a ninth transistor T9, a first capacitor C1, a second capacitor C2, and a third capacitor C3.

In an embodiment, the fourth transistor T4 may further include a back gate that receives the high gate voltage VGH.

The ninth transistor T9 may include a gate connected to the inverting control node NQB, a first terminal that receives the first low gate voltage VGL1, and a second terminal connected to the output node NO. In an embodiment, the ninth transistor T9 may further include a back gate that receives the second low gate voltage VGL2. The ninth transistor T9 may transmit the first low gate voltage VGL1 to the output node NO in response to the voltage of the inverting control node NQB. The ninth transistor T9 may be referred to as an auxiliary pull-down buffer transistor.

Figure 9:
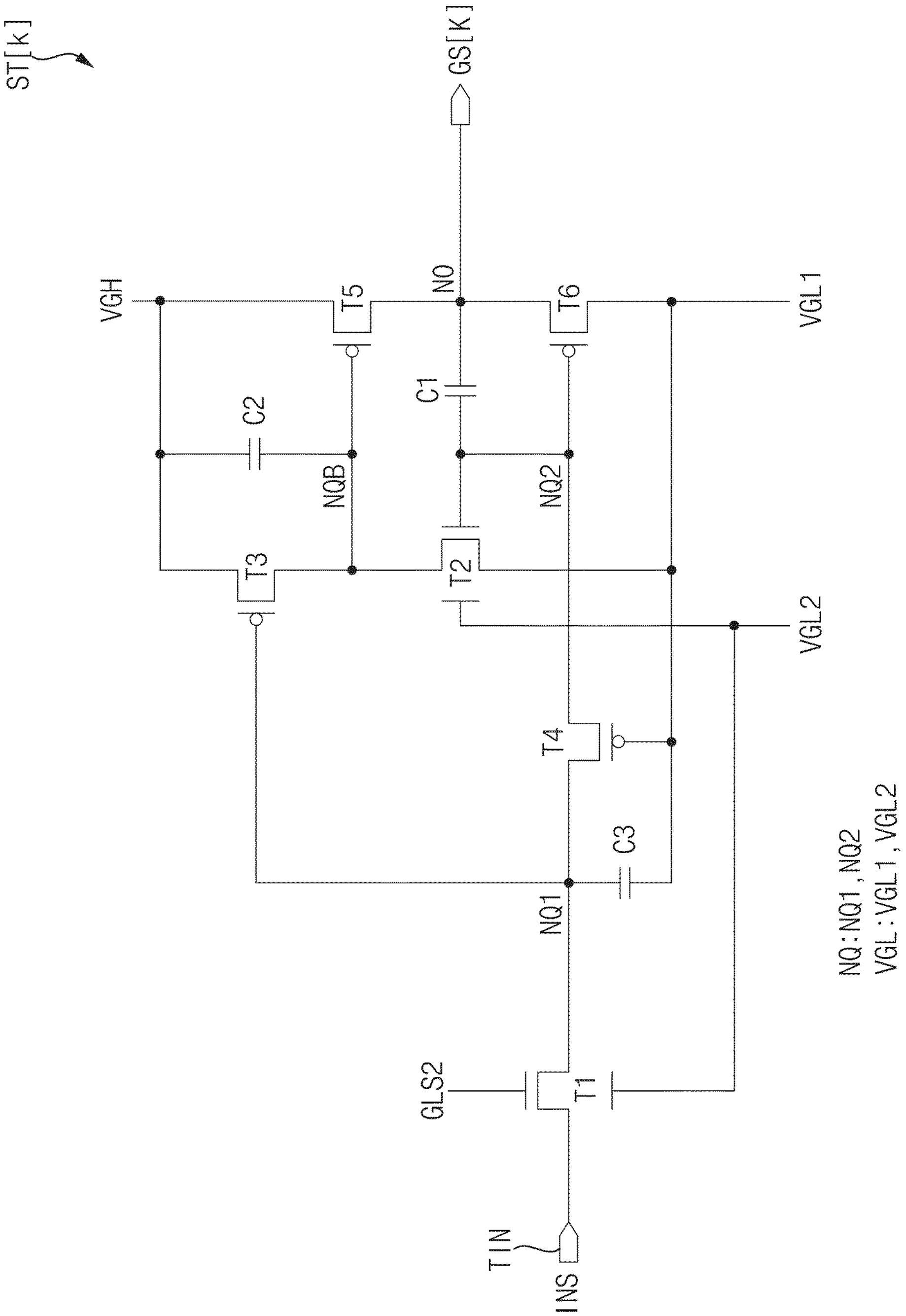
FIG. 9 is a circuit diagram showing an example of a $k^{th}$ stage included in the gate driver of FIG. 5.

FIG. 9 is a circuit diagram showing an example of the $k^{th}$ stage ST[k] included in the gate driver 10 of FIG. 5.

For convenience of explanation, a further description of components of the $k^{th}$ stage ST[k] described with reference to FIG. 9, which are substantially the same as or similar to those of the $k^{th}$ stage ST[k] described with reference to FIG. 6, will be omitted.

Referring to FIG. 9, the $k^{th}$ stage ST[k] may receive an input signal INS, the high gate voltage VGH, the low gate voltage VGL, and a global signal GLS2, and may output a $k^{th}$ gate signal GS[k].

The $k^{th}$ stage ST[k] may include a first transistor T1, a second transistor T2, a third transistor T3, a fourth transistor T4, a fifth transistor T5, a sixth transistor T6, a first capacitor C1, a second capacitor C2, and a third capacitor C3.

The first transistor T1 may be an NMOS transistor. The first transistor T1 may transmit the input signal INS to the control node NQ. In an embodiment, the first transistor T1 may include a gate that receives the global signal GLS2, a first terminal connected to the input terminal TIN, and a second terminal connected to the control node NQ (e.g., the first control node NQ1). In an embodiment, the first transistor T1 may further include a back gate that receives the second low gate voltage VGL2. The first transistor T1 may transmit the input signal INS to the control node NQ in response to the global signal GLS2.

The third capacitor C3 may include a first terminal connected to the first control node NQ1 and a second terminal that receives the first low gate voltage VGL1.

Figure 10:
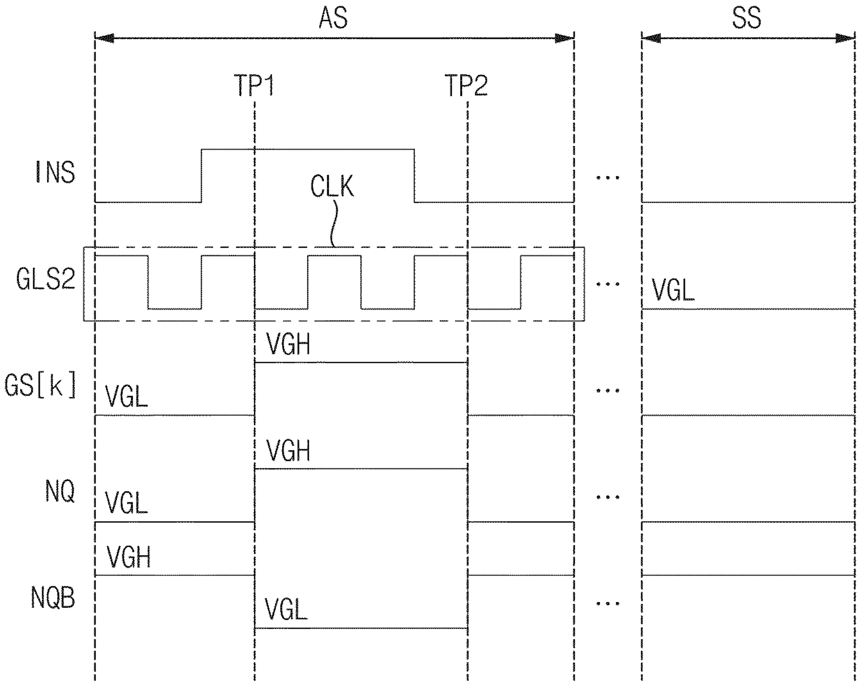
FIG. 10 is a view for describing a driving method of the $k^{th}$ stage of FIG. 9.

FIG. 10 is a view for describing a driving method of the $k^{th}$ stage ST[k] of FIG. 9.

Referring to FIGS. 9 and 10, the global signal GLS2 may have the clock signal CLK in the address scan period AS, and may have the low gate voltage VGL in the self-scan period SS.

The first transistor T1 may be turned on in response to the global signal GLS2 periodically having the high gate voltage VGH in the address scan period AS, and the input signal INS may be transmitted to the control node NQ. Accordingly, the gate signal GS[k] having the high gate voltage VGH may be output in response to the high gate voltage VGH of the control node NQ and the low gate voltage VGL of the inverting control node NQB between the first time point TP1 and the second time point TP2.

In an embodiment, the first transistor T1 may be turned off in response to the global signal GLS2 having the low gate voltage VGL in the self-scan period SS, and the input signal INS is not transmitted to the control node NQ. Accordingly, the gate signal GS[k] having the low gate voltage VGL may be output in response to the low gate voltage VGL of the control node NQ and the high gate voltage VGH of the inverting control node NQB in the self-scan period SS.

When the first transistor T1 is a PMOS transistor, a leakage current may occur from the gate of the sixth transistor T6 through the first and fourth transistors T1 and T4, which are the PMOS transistors connected to the control node NQ in the self-scan period SS, and accordingly, the voltage of the control node NQ may rise from the low gate voltage VGL, and the gate signal GS[k] may rise from the low gate voltage VGL. In this case, as the voltage of the gate signal GS[k] rises in the self-scan period SS, the reliability of the gate driver 10 may be decreased.

In an embodiment of the present disclosure, because the first transistor T1 is an NMOS transistor, a leakage current does not occur from the gate of the sixth transistor T6 in the self-scan period SS. As a result, the voltage of the control node NQ may be maintained at the low gate voltage VGL, and the gate signal GS[k] may remain stable at the low gate voltage VGL. By ensuring the gate signal GS[k] stays at the low gate voltage VGL in the self-scan period SS, the reliability of the gate driver 10 may be increased.

Figure 11:
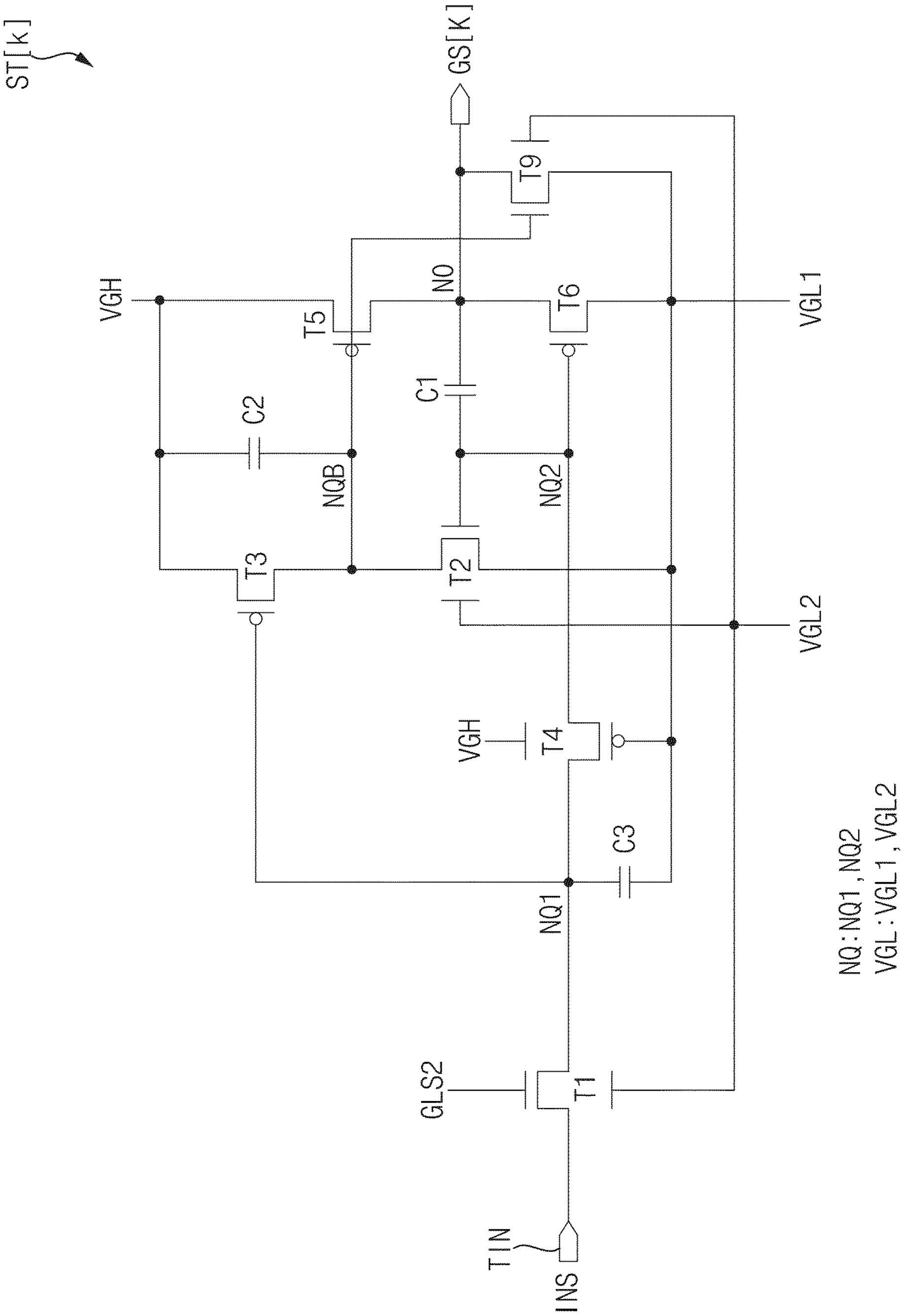
FIG. 11 is a circuit diagram showing an example of a $k^{th}$ stage included in the gate driver of FIG. 5.

FIG. 11 is a circuit diagram showing an example of the $k^{th}$ stage ST[k] included in the gate driver 10 of FIG. 5.

For convenience of explanation, a further description of components of the $k^{th}$ stage ST[k] described with reference to FIG. 11, which are substantially the same as or similar to those of the $k^{th}$ stage ST[k] described with reference to FIG. 9, will be omitted.

Referring to FIG. 11, the $k^{th}$ stage ST[k] may include a first transistor T1, a second transistor T2, a third transistor T3, a fourth transistor T4, a fifth transistor T5, a sixth transistor T6, a ninth transistor T9, a first capacitor C1, a second capacitor C2, and a third capacitor C3.

In an embodiment, the fourth transistor T4 may further include a back gate that receives the high gate voltage VGH.

The ninth transistor T9 may include a gate connected to the inverting control node NQB, a first terminal that receives the first low gate voltage VGL1, and a second terminal connected to the output node NO. In an embodiment, the ninth transistor T9 may further include a back gate that receives the second low gate voltage VGL2. The ninth transistor T9 may transmit the first low gate voltage VGL1 to the output node NO in response to the voltage of the inverting control node NQB.

Figure 12:
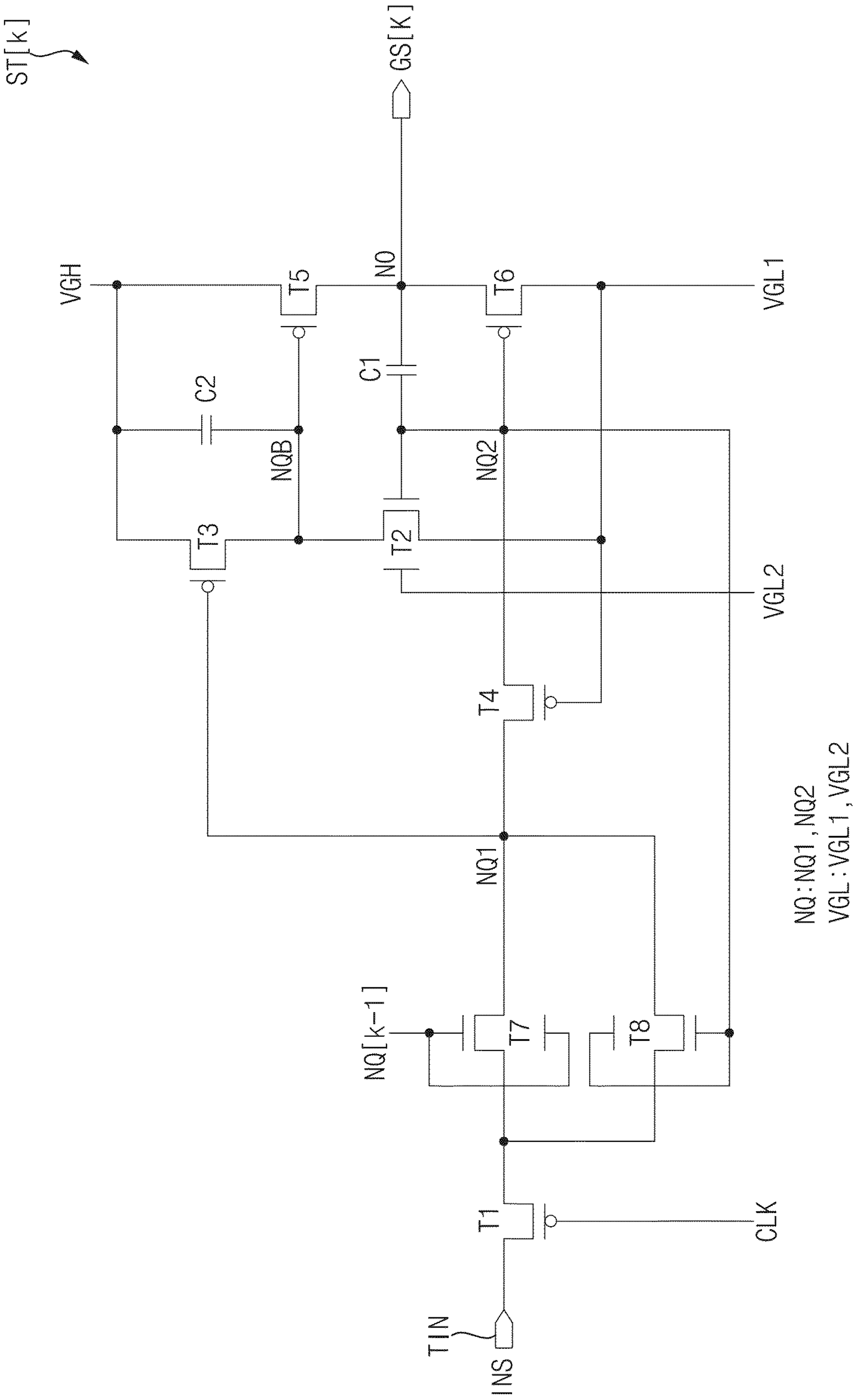
FIG. 12 is a circuit diagram showing an example of a $k^{th}$ stage included in the gate driver of FIG. 5.

FIG. 12 is a circuit diagram showing an example of the $k^{th}$ stage ST[k] included in the gate driver 10 of FIG. 5.

For convenience of explanation, a further description of components of the $k^{th}$ stage ST[k] described with reference to FIG. 12, which are substantially the same as or similar to those of the $k^{th}$ stage ST[k] described with reference to FIG. 6, will be omitted.

Referring to FIG. 12, the $k^{th}$ stage ST[k] may receive an input signal INS, a clock signal CLK, the high gate voltage VGH, the low gate voltage VGL, and a voltage of a control node NQ[k−1] (hereinafter, a previous control node) of the $k-1^{th}$ stage ST[k−1], and may output a $k^{th}$ gate signal GS[k].

The $k^{th}$ stage ST[k] may include a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2.

The seventh transistor T7 may be an NMOS transistor. The seventh transistor T7 may be connected between the second terminal of the first transistor T1 and the gate of the sixth transistor T6, and may include a gate that receives a voltage of the previous control node NQ[k−1]. In an embodiment, the seventh transistor T7 may further include a back gate that receives the voltage of the previous control node NQ[k−1].

In an embodiment, as shown in FIG. 12, the first terminal of the seventh transistor T7 may be connected to the second terminal of the first transistor T1, and the second terminal of the seventh transistor T7 may be connected to the first control node NQ1. In this case, the seventh transistor T7 may connect the second terminal of the first transistor T1 and the first control node NQ1 in response to the voltage of the previous control node NQ[k−1]. In an embodiment, the first terminal of the seventh transistor T7 may be connected to the second terminal of the fourth transistor T4, and the second terminal of the seventh transistor T7 may be connected to the second control node NQ2. In this case, the seventh transistor T7 may connect the second terminal of the first transistor T4 and the second control node NQ2 in response to the voltage of the previous control node NQ[k−1].

The eighth transistor T8 may be an NMOS transistor. The eighth transistor T8 may include a gate connected to the control node NQ, a first terminal connected to the first terminal of the seventh transistor T7, and a second terminal connected to the second terminal of the seventh transistor T7. In an embodiment, the eighth transistor T8 may further include a back gate connected to the control node NQ. Although FIG. 12 illustrates an embodiment in which the gate of the eighth transistor T8 is connected to the second control node NQ2, the present disclosure is not limited thereto. For example, in an embodiment, the gate of the eighth transistor T8 may be connected to the first control node NQ1.

Figure 13:
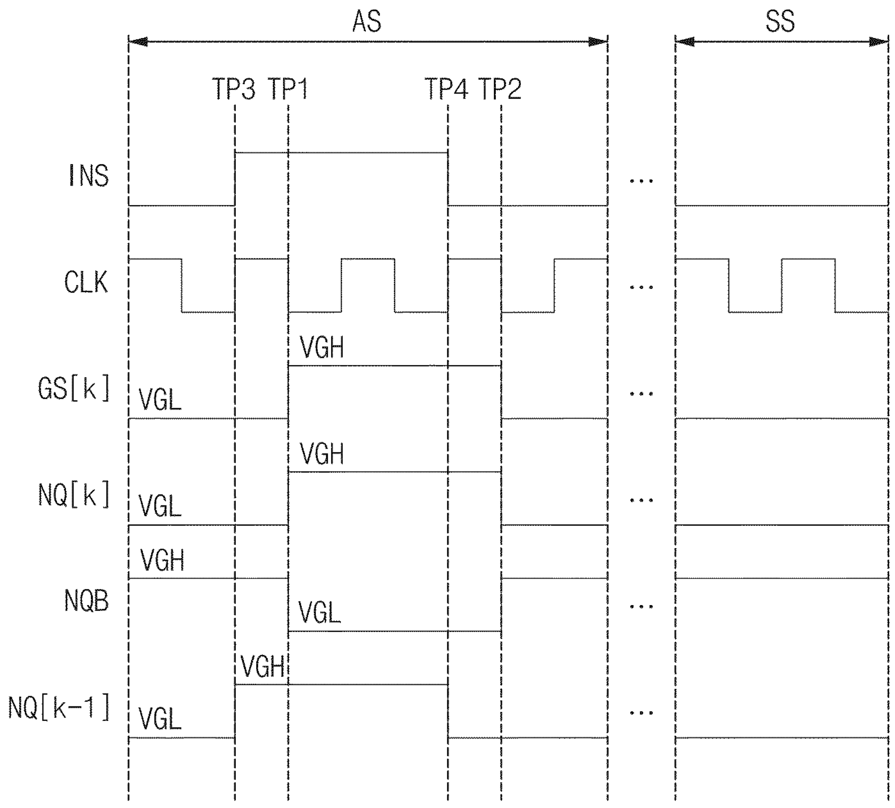
FIG. 13 is a view for describing a driving method of the $k^{th}$ stage of FIG. 12.

FIG. 13 is a view for describing a driving method of the $k^{th}$ stage ST[k] of FIG. 12.

Referring to FIGS. 12 and 13, the seventh transistor T7 may be turned on in response to the voltage of the previous control node NQ[k−1] having the high gate voltage VGH between a third time point TP3 and a fourth time point TP4 in the address scan period AS, and the second terminal of the first transistor T1 may be connected to the control node NQ. The third time point TP3 and the fourth time point TP4 may be time points which are shifted forward by one horizontal time period from the first time point TP1 and the second time point TP2, respectively. Further, the eighth transistor T8 may be turned on in response to the voltage of the control node NQ[k] having the high gate voltage VGH between the first time point TP1 and the second time point TP2 in the address scan period AS, and the second terminal of the first transistor T1 may be connected to the control node NQ. Accordingly, the input signal INS may be transmitted to the control node NQ in the address scan period AS, and the gate signal GS[k] having the high gate voltage VGH may be output in response to the high gate voltage VGH of the control node NQ and the low gate voltage VGL of the inverted control node NQB between the first time point TP1 and the second time point TP2.

In an embodiment, the seventh transistor T7 may be turned off in response to the voltage of the previous control node NQ[k−1] having the low gate voltage VGL in the self-scan period SS, the eighth transistor T8 may be turned off in response to the voltage of the control node NQ[k] having the low gate voltage VGL, and the second terminal of the first transistor T1 is not connected to the control node NQ. Accordingly, in an embodiment, the input signal INS is not transmitted to the control node NQ in the self-scan period SS, and the gate signal GS[k] having the low gate voltage VGL may be output in response to the low gate voltage VGL of the control node NQ and the high gate voltage VGH of the inverting control node NQB.

When the $k^{th}$ stage ST[k] does not include the seventh transistor T7 and the eighth transistor T8, a leakage current may occur from the gate of the sixth transistor T6 through the first and fourth transistors T1 and T4, which are PMOS transistors connected to the control node NQ in the self-scan period SS, and accordingly, the voltage of the control node NQ may rise from the low gate voltage VGL, and the gate signal GS[k] may rise from the low gate voltage VGL. In this case, as the voltage of the gate signal GS[k] rises in the self-scan period SS, the reliability of the gate driver 10 may be decreased.

In an embodiment of the present disclosure, because the $k^{th}$ stage ST[k] includes the seventh transistor T7 and the eighth transistor T8, which are NMOS transistors disposed between the input terminal TIN and the control node NQ, a leakage current does not occur from the gate of the sixth transistor T6 in the self-scan period SS. As a result, the voltage of the control node NQ may be maintained at the low gate voltage VGL, and the gate signal GS[k] may remain stable at the low gate voltage VGL. By ensuring the gate signal GS[k] stays at the low gate voltage VGL in the self-scan period SS, the reliability of the gate driver 10 may be increased.

Figure 14:
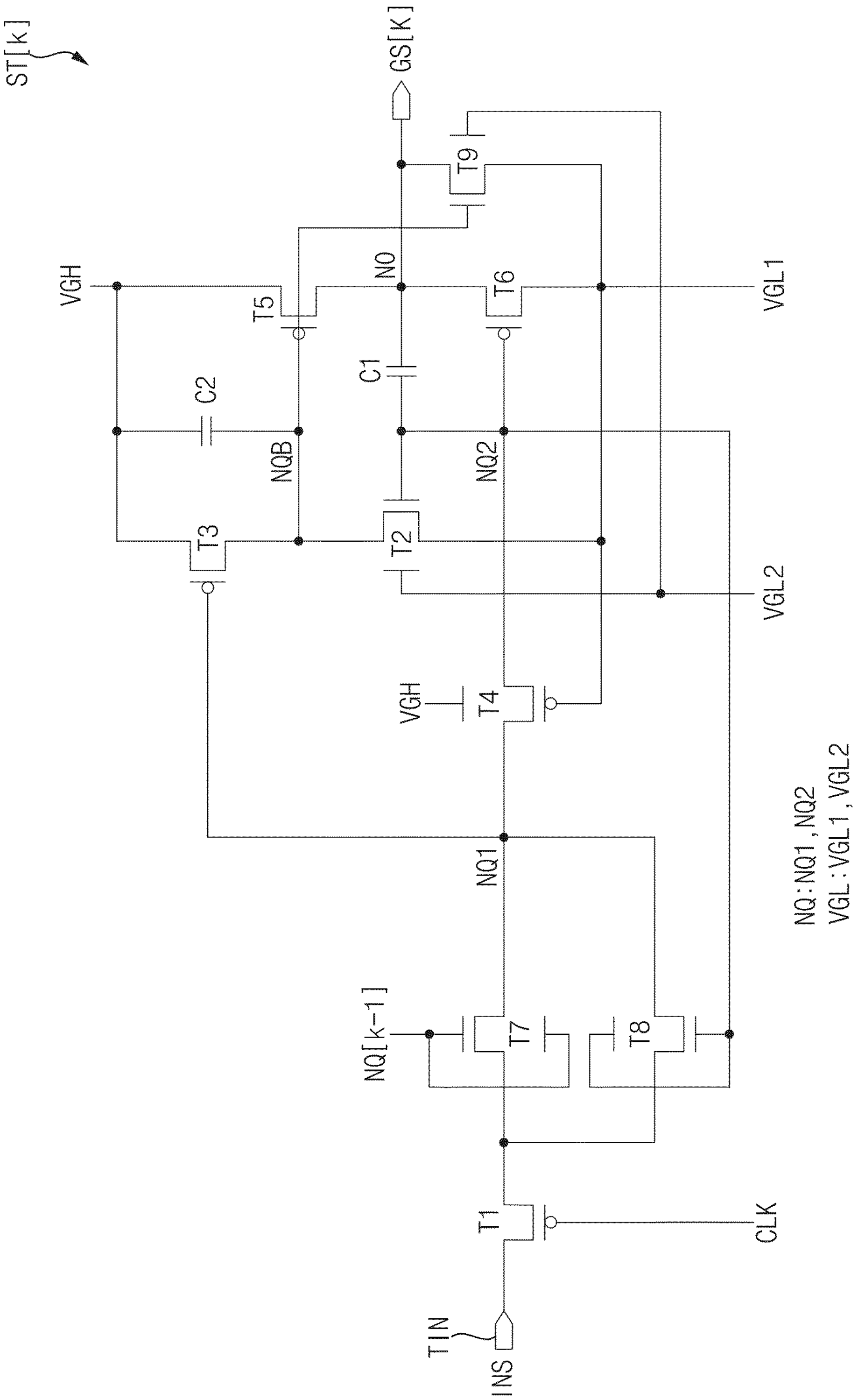
FIG. 14 is a circuit diagram showing an example of a $k^{th}$ stage included in the gate driver of FIG. 5.

FIG. 14 is a circuit diagram showing an example of the $k^{th}$ stage ST[k] included in the gate driver 10 of FIG. 5.

For convenience of explanation, a further description of components of the $k^{th}$ stage ST[k] described with reference to FIG. 14, which are substantially the same as or similar to those of the $k^{th}$ stage ST[k] described with reference to FIG. 12, will be omitted.

Referring to FIG. 14, the $k^{th}$ stage ST[k] may include a first transistor T1, a second transistor T2, a third transistor T3, a fourth transistor T4, a fifth transistor T5, a sixth transistor T6, a seventh transistor T7, an eighth transistor T8, a ninth transistor T9, a first capacitor C1, and a second capacitor C2.

In an embodiment, the fourth transistor T4 may further include a back gate that receives the high gate voltage VGH.

The ninth transistor T9 may include a gate connected to the inverting control node NQB, a first terminal that receives the first low gate voltage VGL1, and a second terminal connected to the output node NO. In an embodiment, the ninth transistor T9 may further include a back gate that receives the second low gate voltage VGL2. The ninth transistor T9 may transmit the first low gate voltage VGL1 to the output node NO in response to the voltage of the inverting control node NQB.

Figure 15:
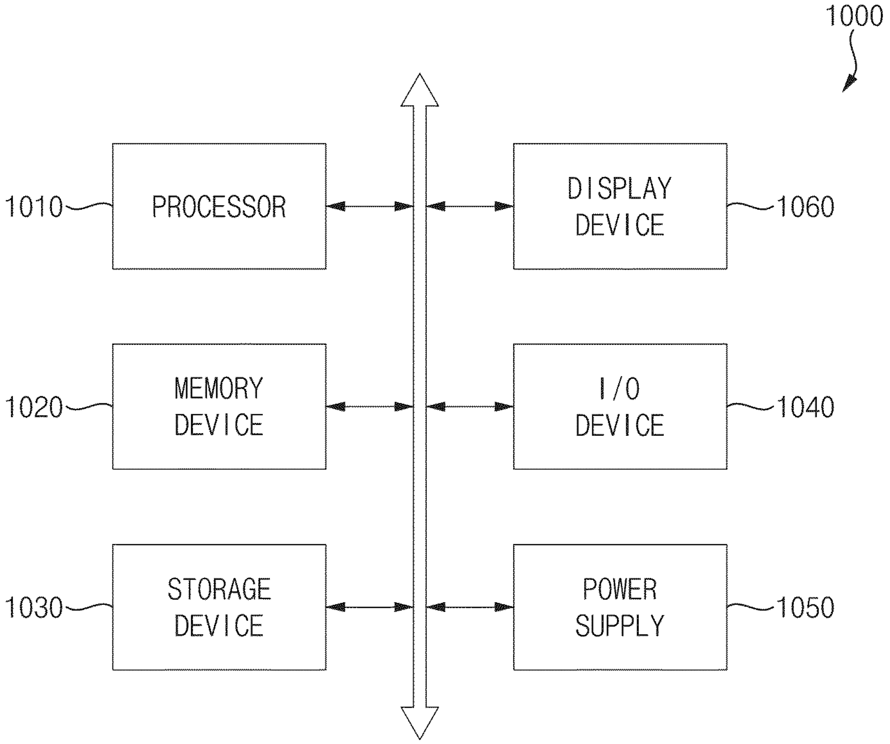
FIG. 15 is a block diagram showing an electronic apparatus according to an embodiment.

FIG. 15 is a block diagram showing an electronic apparatus 1000 according to an embodiment.

Referring to FIG. 15, the electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with, for example, a video card, a sound card, a memory card, a USB device, and the like, or communicating with other systems.

The processor 1010 may perform specific calculations or tasks. According to an embodiment, the processor 1010 may be, for example, a microprocessor, a central processing unit (CPU), or the like. The processor 1010 may be connected to other components through, for example, an address bus, a control bus, a data bus, and the like. According to an embodiment, the processor 1010 may also be connected to an expansion bus such as a peripheral component interconnect (PCI) bus. In an embodiment, the processor 1010 may provide the first image data (IMD1 of FIG. 1), the controller control signal (CNT of FIG. 1), or the like to the display device 1060.

The memory device 1020 may store data utilized for an operation of the electronic apparatus 1000. For example, the memory device 1020 may include a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM), and/or a volatile memory device such as a dynamic random access memory (DRAM), a static random access memory (SRAM), or a mobile DRAM.

The storage device 1030 may include, for example, a solid state drive (SSD), a hard disk drive (HDD), a CD-ROM, and the like. The I/O device 1040 may include an input device such as, for example, a keyboard, a keypad, a touch pad, a touch screen, or a mouse, and an output device such as, for example, a speaker or a printer. The power supply 1050 may supply power utilized for the operation of the electronic apparatus 1000. The display device 1060 may be connected to other components through the buses or other communication links. The display device 1060 may correspond to the display device 100 of FIG. 1.

In a gate driver included in the display device 1060, an NMOS transistor may be disposed between an input terminal and a control node. As a result, in an embodiment, a leakage current does not occur from a gate of a pull-down buffer transistor in a self-scan period. Accordingly, a gate signal may be maintained at a low gate voltage in the self-scan period, and the reliability of the gate driver may be increased.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

The gate driver according to embodiments of the present disclosure may be included in a display device included in, for example, a computer, a notebook, a mobile phone, a smart phone, a smart pad, a smart watch, a PMP, a PDA, an MP3 player, or the like.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A gate driver including a plurality of stages, each of the plurality of stages comprising:
- a first transistor which transmits an input signal to a first control node;
- a fifth transistor including a gate connected to an inverting control node, a first terminal which receives a high gate voltage, and a second terminal connected to an output node from which a gate signal is output;
- a sixth transistor including a gate connected to a second control node, a first terminal which receives a first low gate voltage or a clock signal, and a second terminal connected to the output node; and
- a seventh transistor connected between a terminal of the first transistor and the gate of the sixth transistor, and including a gate which receives a global signal having the high gate voltage in an address scan period and the first low gate voltage in a self-scan period.

2. The gate driver of claim 1, wherein each of the plurality of stages further comprises:
- a second transistor including a gate connected to the second control node, a first terminal which receives the first low gate voltage, and a second terminal connected to the inverting control node; and
- a third transistor including a gate connected to the first control node, a first terminal which receives the high gate voltage, and a second terminal connected to the inverting control node.

3. The gate driver of claim 1, wherein each of the plurality of stages further comprises:
- a fourth transistor including a gate which receives the first low gate voltage, a first terminal connected to the first control node, and a second terminal connected to the second control node.

4. The gate driver of claim 3, wherein the fourth transistor further includes a back gate which receives the high gate voltage.

5. The gate driver of claim 1, wherein each of the plurality of stages further comprises:
- a first capacitor including a first terminal connected to the second control node and a second terminal connected to the output node; and
- a second capacitor including a first terminal which receives the high gate voltage and a second terminal connected to the inverting control node.

6. The gate driver of claim 1, wherein each of the plurality of stages further comprises:
- a third capacitor including a first terminal connected to the first control node and a second terminal which receives a second low gate voltage.

7. The gate driver of claim 1, wherein each of the plurality of stages further comprises:
- a ninth transistor including a gate connected to the inverting control node, a first terminal which receives the first low gate voltage, and a second terminal connected to the output node.

8. An electronic apparatus comprising:
- a display panel including a plurality of pixels;
- a gate driver including a plurality of stages which provide a plurality of gate signals to the plurality of pixels;
- a controller which provides a gate control signal to the gate driver; and
- a processor which provides a controller control signal to the controller,
- wherein each of the plurality of stages comprises:
  - a first transistor which transmits an input signal to a first control node;
  - a fifth transistor including a gate connected to an inverting control node, a first terminal which receives a high gate voltage, and a second terminal connected to an output node from which one of the plurality of gate signals is output;
  - a sixth transistor including a gate connected to a second control node, a first terminal which receives a first low gate voltage or a clock signal, and a second terminal connected to the output node; and
  - a seventh transistor connected between a terminal of the first transistor and the gate of the sixth transistor, and including a gate which receives a global signal having the high gate voltage in an address scan period and the first low gate voltage in a self-scan period.

* * * * *